United States Patent [19]

Engwall

[11] Patent Number: 5,544,453
[45] Date of Patent: Aug. 13, 1996

[54] FOUNDATION FOR A BUILDING STRUCTURE

[75] Inventor: Sten Engwall, Märsta, Sweden

[73] Assignee: System Teeg AB, Bromma, Sweden

[21] Appl. No.: 146,062

[22] PCT Filed: May 8, 1992

[86] PCT No.: PCT/SE92/00302

§ 371 Date: Nov. 9, 1993

§ 102(e) Date: Nov. 9, 1993

[87] PCT Pub. No.: WO92/20883

PCT Pub. Date: Nov. 26, 1992

[30] Foreign Application Priority Data

May 10, 1991 [SE] Sweden .................................. 9101414

[51] Int. Cl.⁶ .................................. E04B 1/62; E02D 27/01
[52] U.S. Cl. .................. 52/169.5; 52/169.11; 52/220.1; 52/302.3
[58] Field of Search ............................... 52/302.3, 302.1, 52/169.5, 169.11, 236.3, 220.1; 454/246, 247, 287, 289, 307, 254

[56] References Cited

U.S. PATENT DOCUMENTS

| | | | |
|---|---|---|---|
| Re. 20,851 | 9/1938 | Wood | 52/302.3 |
| 688,132 | 12/1901 | Sims | 454/246 |
| 710,307 | 9/1902 | Voelkel | 52/302.3 |
| 1,974,767 | 9/1934 | Clark | 52/302.3 |
| 2,206,119 | 7/1940 | Persons . | |
| 2,839,659 | 6/1958 | Cotts et al. | 454/287 |
| 4,103,059 | 7/1978 | Kautz | 52/795 |
| 4,290,415 | 9/1981 | Tatsumi . | |
| 4,296,798 | 10/1981 | Schramm | 52/302.3 |
| 4,843,786 | 7/1989 | Walkinshaw et al. | 52/302.3 |

FOREIGN PATENT DOCUMENTS

| | | |
|---|---|---|
| 2250076 | 5/1975 | France . |
| 435210 | 9/1984 | Sweden . |

*Primary Examiner*—Michael Safavi
*Attorney, Agent, or Firm*—Watson Cole Stevens Davis, P.L.L.C.

[57] ABSTRACT

A building construction in which a floor story of the building rests on a foundation which, in turn, lies on the ground. An insulated and separate service space has been created beneath the floor story of the living accommodation, with room for accommodating heating, ventilation, and water supply systems as well as electrical systems. The insulated service space is formed mainly by the floor story of the building, a ground insulating layer, and a surrounding foundation wall. A gap is provided between the insulated service space and the first story with the gap extending along the inside of each foundation wall. A heating source is provided within the service space and exhausts heated air directly into the service space with the heated air flowing upwardly through the gap into the first story area.

8 Claims, 4 Drawing Sheets

Fig. 2a.
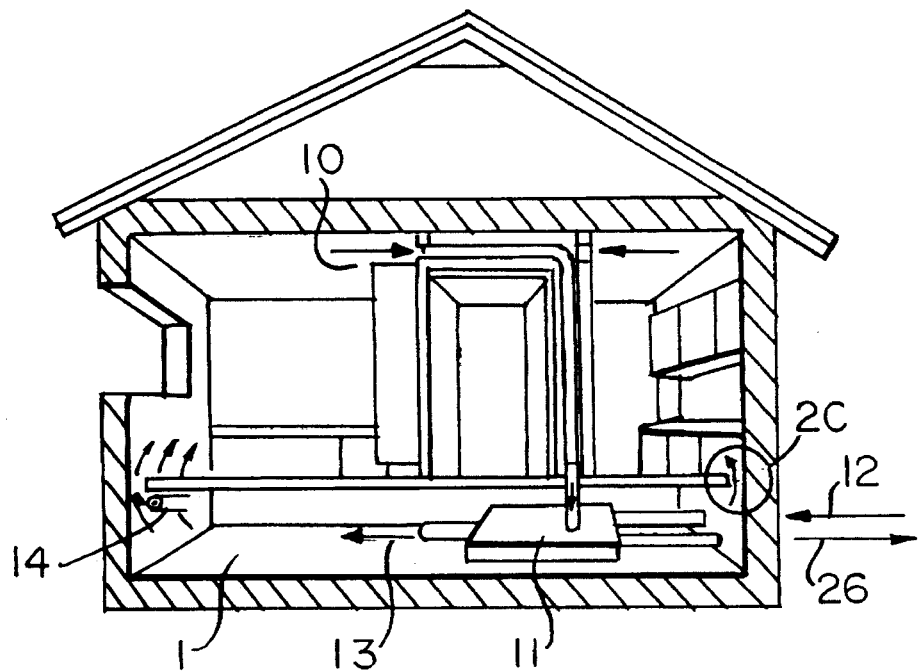
Fig. 2b.
Fig. 2c.
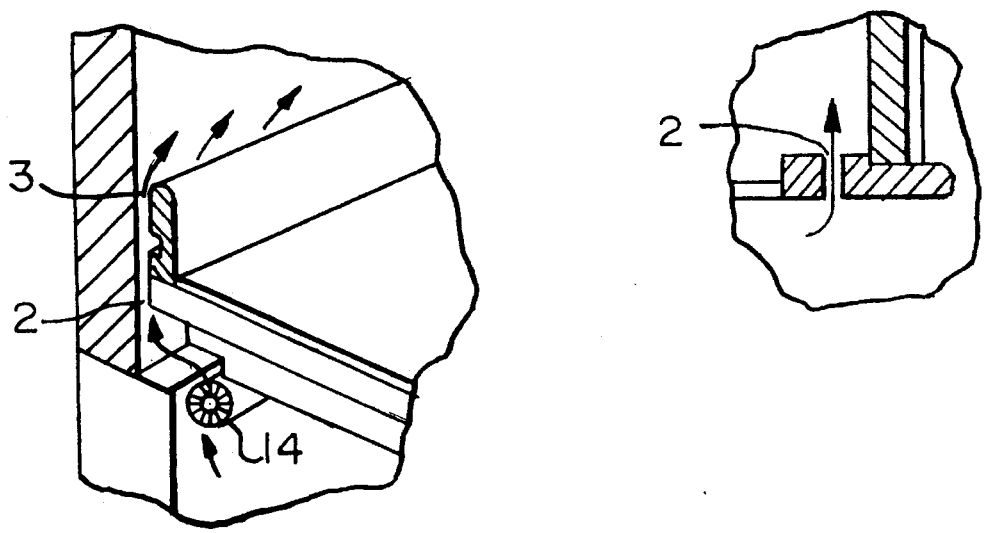

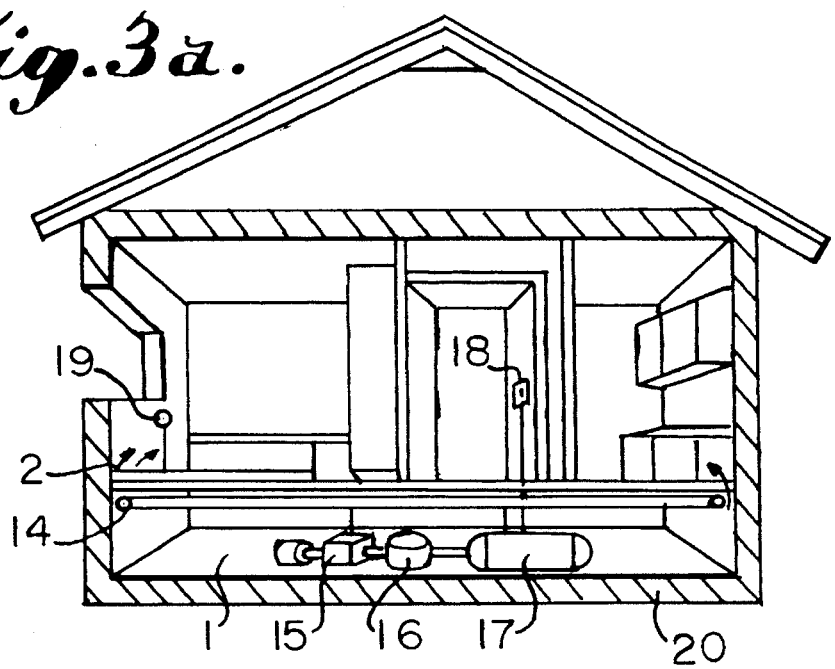
Fig. 3a.
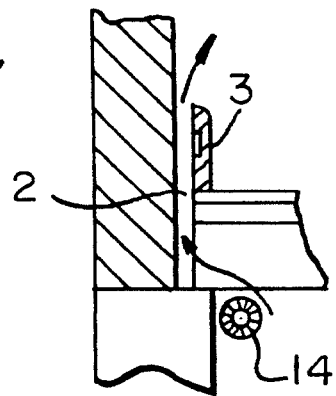
Fig. 3b.
Fig. 4.
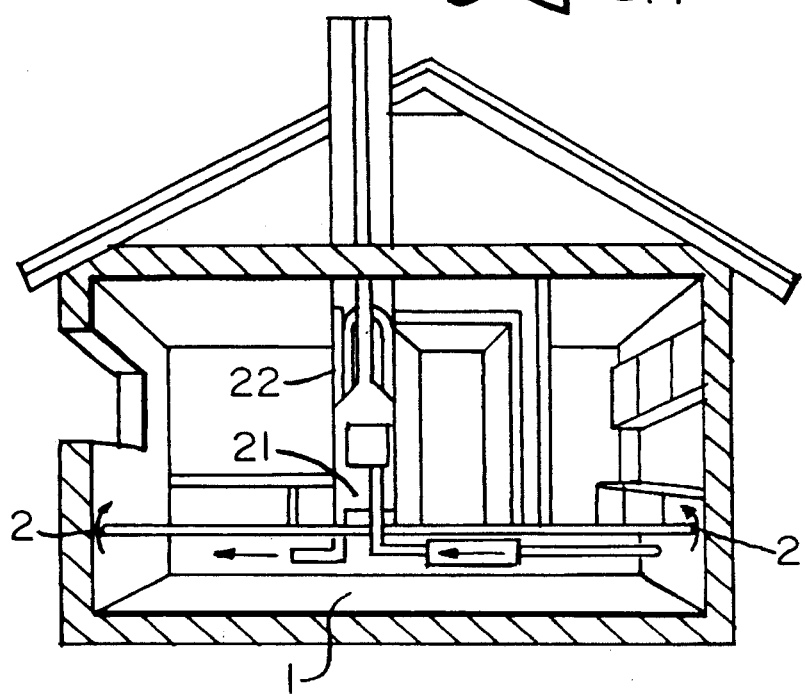

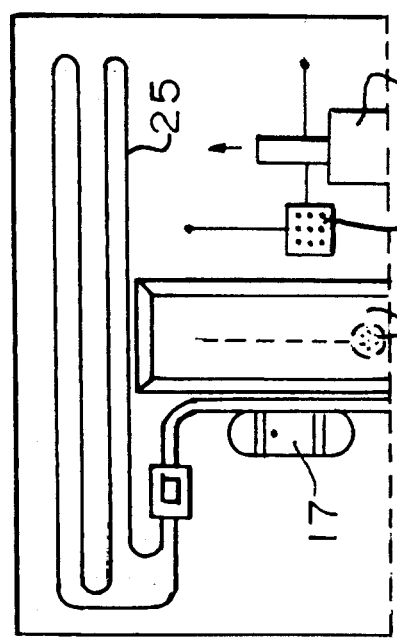
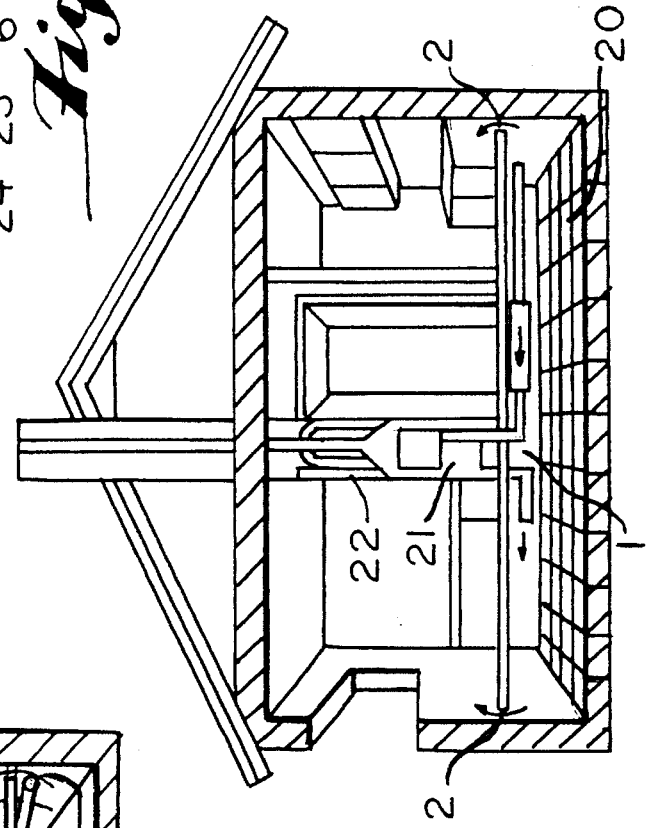
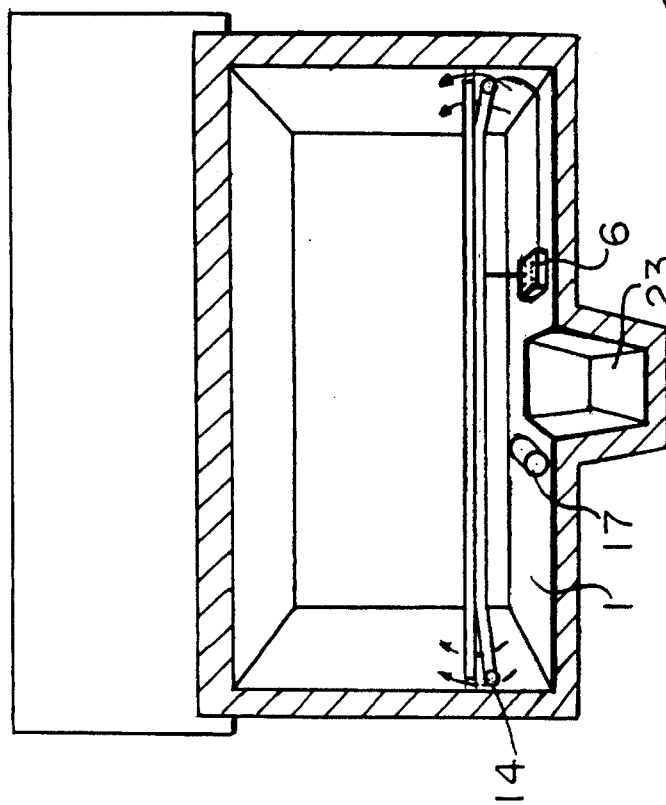

FOUNDATION FOR A BUILDING STRUCTURE

BACKGROUND OF THE INVENTION

1. Technical Field

The present invention relates to a method for constructing a building foundation and also to a building foundation constructed in accordance with the method where the floor storey rests essentially on the foundations, which lie on the ground.

2. Description of the Prior Art

In earlier times, it was usual to construct buildings or houses directly on the ground with earthen floors. Later on, buildings were provided with better floors comprised of floor boards which were laid directly on the ground. As time progressed, however, building constructions were improved and the floor was raised from the surface of the ground, therewith enabling the floor to be insulated. A cavity was defined between floor and ground surface. This type of foundation is often referred to today as a "cottage foundation". However, foundations of this kind must always be ventilated in order to avoid moisture penetrating into the floor structure. With the passage of time, it became more and more usual to excavate the entire foundation area, including blasting and removal of rock, so as to enable the construction of a complete cellar or basement storey. The cellar could then be used as a larder and also as a place in which present-day heating boiler arrangements could be installed. The important cellar breakthrough, in construction terms, arrived when it became possible to excavate with the aid of mechanical equipment. In the present time, the endeavour to reduce building costs has been the prime reason why building contractors have departed from the cellar concept to a large extent. In addition, the need to store food and the like in cellar premises is not as prevalent today as it was earlier.

SUMMARY OF THE INVENTION

With the intention of simplifying the construction of a building and its possible conversion, and therewith to reduce building costs, obtain improved heating economy, to simplify electrical wiring and to afford ready access to building running and operating systems, there has been developed a method for the provision of a service foundation which defines air gaps relative to a building structure and a service foundation with gaps, where an insulated and separate service space is provided beneath the floor of the living quarters of the building, this space providing adequate for room to accommodate all devices used, for instance, for heating, ventilate and water-supply purposes. The insulated service space is generally defined by the bottom floor of the building, a ground-supported insulating layer and a surrounding, insulating foundation wall or corresponding structural element. Disposed between the insulated space and a first storey of the building is a gap which extends along the inside of the outer wall and through which air is able to pass and wires and cables can be drawn. The insulated space is conveniently provided with a central passage, dike or the like which can be used as a corridor should the height of the insulating space be found insufficient for comfortable handling of appliances installed in the service space.

In order to show that a service foundation in which air gaps that lead to the overlying building structure constitutes a fundamentally novel concept within the building construction field, a comparison will now be made with the earlier car manufacturing principles practiced in accordance with the concepts and ideas of Henry Ford. When the first automobile was to be manufactured, the car manufacturer first made enquiries of the wheel manufacturer who was capable of delivering the most suitable wheels, and then the vehicle lighting manufacturer who was capable of delivering the most suitable vehicle lighting, etc. The manufacturers entrusted by the automobile manufacturer studied his requirements and needs and, in competition with other possible suppliers, delivered its products and probably also contributed with proposals concerning the most attractive design products possible. In the continued development of automobile manufacture, it became obvious that the Ford manufacturer, as with all other vehicle manufacturers, decided exactly what should be delivered with regard to design in the form of technical solutions. Had the automobile not been controlled "centrally" from a main principal responsible for total production, present-day vehicle lamps would have the form of separate units, whereas today vehicle lamps form a part of the fender wing, or rather a part of the chassis, as parts of the total solution.

The art of building construction has a totally different background and development. Before the industrial breakthrough, the constructional design of a building, or house, was the responsibility of one man. Even though different crafts had been developed, the work of each craftsman in the creation of the house, or building, could be controlled by the building contractor or master builder. Deviations from a given building plan became difficult to achieve, both with regard to economy and also with regard to functional adaptation of the building to accommodate service units, etc. Consequently, the building construction industry has digressed still further from the total concept of enabling optimations and synergistic effects to be achieved, primarily with regard to detached houses. In the case of very large building projects, it is possible that building construction will be influenced, in certain aspects, by higher authorities, such as planning authorities.

In the changing world in which we live, the need for completely new products arises. Because of the drastic increase in energy costs, it is necessary to save energy in different ways. For instance, 20–30% of the heat generated in a building escapes through the windows of the building, and consequently either the window surfaces must be made smaller or better insulated. Energy is also consumed by ventilation, and hence heat recovery systems become desirable and further apparatus and systems to this end are developed commercially.

However, there is no institution, authority or body in present-day society whose function is to develop a total concept which includes optimal building construction solutions, in the same manner as the automobile manufacturer. Seen objectively, the design and desire for optimation should extend further than the actual building construction technology itself and should also include social and community-economic factors. The need for novel forms of domestic housing should also be developed and considered in the total solutions, because of changed social conditions.

The automobile is adapted to the nature of the roads on which it is driven. When improved roads are built which permit higher vehicle speeds, the engine power of the vehicle is adapted hereto. Tire studs were introduced by the automobile industry in order to enhance traffic safety. This introduction was first accepted and then forbidden when weighing-up the community-economic factors involved, on the basis of experience. When the ordinary family wished to carry more baggage in the trunk, or boot, and to provide space for children in the back seat, the automobile manufacturers responded by appropriate automobile design, including divided back supports in the cars produced thereby.

The industry which serves the building branch adapts itself in certain respects to our changing world. As a result of social developments in the community, dwellings now stand empty over an eight-hour period each calendar day, when both parents are at work and their children are either at school, kindergarten and like organizations. This increases the risk of robbery and theft, and consequently burglar alarms are sold for connection to door locks, etc.

It is not least conceivable to connect to the door lock a mechanical ventilation system which is adapted to a contemplated maximum load. Although a product of this kind would probably be difficult to sell as a separate unit, it would constitute a relatively small part of the total concept. If heat recovery from exhaust air is effected by heating the hot tap water instead of the supply air, this saving possibility is limited. Thus, this is one of the many examples of the present complication of the technique which necessitates consideration of the consequences to the total solutions. The conclusion is thus that the fact that the dwelling is empty for eight hours each calendar day should be made a basis on which technical solutions are found.

The present invention is a first link in the creation of economic conditions for a company to introduce a total concept which requires incorporeal rights so that the necessary investments made have a reasonable chance of being recovered.

Consequently, with the introduction of mechanical ventilating systems in present-day dwellings, instead of natural ventilation, a logical step in the development has been to construct an insulated and separate service space, which is formed with a surrounding gap so that the space will form part of the ventilation system, which need not cost more than a heated foundation or part of a low-rise house foundation (not solely plinths) or a bottom slab, but which will provide a number of installation-technical advantages and energy savings. Even though buildings are still constructed essentially on the ground, the main advantages of an insulated and separate space beneath the floor storey is still utilized and availed upon. All technical appliances belonging to the building can be placed in this insulated space. Because these technical appliances can be placed within such space, the installation can be simplified and made less expensive while retaining the effect of such appliances. Requirements with regard to aesthetic appearance can be reduced and the need of casings and housings to meet these requirements no longer exist. Functional requirements become more important than aesthetic appearance than when the appliance/apparatus is placed in the domestic living area. Future complementary installations, modifications or changes in building design can be achieved in a simpler fashion with the insulated service foundation, without adding to the expense. The ventilation system can be designed so that all channels are accessible for cleaning purposes. Appropriate conduits are drawn from the wet spaces essentially vertically down to the service space, where the conduit can be diverted horizontally. An inspection flap, hatch or the like through which the entire conduit can be reached may be fitted in the conduit elbow. The roof of a corridor space may be lowered and made removable, to simplify access.

In the case of a house which includes a service foundation, running of the apparatus and appliances can be checked and controlled and maintained without service personnel or craftsmen needing to enter the living accommodation of the building concerned and without the assistance of any other person. A code lock fitted to the door or entrance hatch to the service foundation will allow only authorized access to the service space.

BRIEF DESCRIPTION OF THE DRAWINGS

FIG. 2A illustrates schematically the manner in which ventilation can be in a house which includes an inventive insulated service foundation.

FIG. 2B illustrates the passage of air through a gap defined between an external wall and the floor.

FIG. 2C illustrates the passage of air through an opening provided in a kitchen space.

FIG. 3A illustrates schematically how room heat and hot tap water can be obtained in a house which includes an inventive insulated service foundation.

FIG. 3B illustrates schematically the positioning of a radiator adjacent a gap defined by an outer wall and a floor structure.

FIG. 4 illustrates schematically the manner in which an open oven can be installed in a house provided with an inventive insulated service foundation.

FIG. 5A illustrates schematically the provision of a corridor-like recess in an insulated service foundation.

FIG. 5B is a top view of part of the foundation illustrated in FIG. 5A.

FIG. 6 depicts the embodiment of FIG. 4 when including insulation on the ground floor of the foundation.

DESCRIPTION OF PREFERRED EMBODIMENTS

Figure 1A:
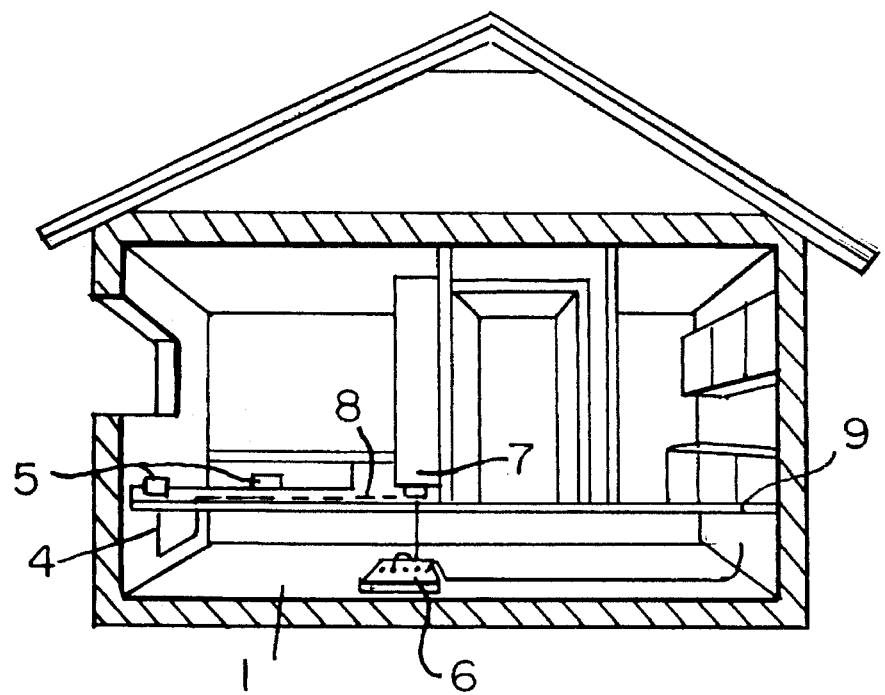
FIG. 1A illustrates schematically an electrical installation in a house which includes an inventive, insulated service foundation.
Figure 1B:
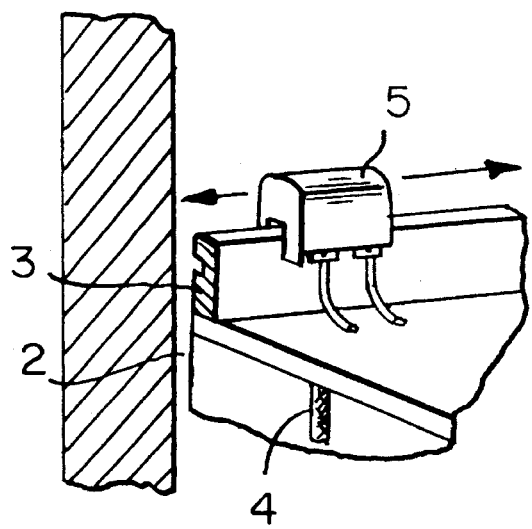
FIGS. 1B and C illustrate a moveable electric contact in detail.
Figure 1C:
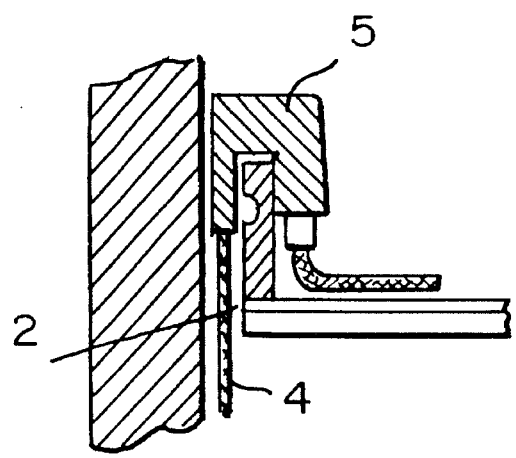

The coldest zone of a ground-erected dwelling is always located at the transition between floor and external wall. It is therefore natural to heat this zone first. Present-day dwelling houses are more often than not ventilated mechanically, and it is therefore more natural to heat such dwellings by heating the ventilation air in one way or another. Direct-acting electrical elements are nowadays avoided, whereas the use of water which has been heated with the aid of electrical appliances is, on the other hand, accepted. It is therefore more appropriate to position heat-emitting water-carrying elements in a manner such as to force the mechanically distributed air flow to pass over such elements. The elements, or radiators, are therefore normally placed beneath windows in external walls, although they occupy valuable space.

In the case of the described exemplifying embodiment of the inventive service foundation, the water-carrying heating elements are, instead, positioned in the vicinity of a gap which extends between floor and external wall, beneath the floor structure. The heating elements may have a known construction. The heating elements can be controlled in a traditional fashion, with the aid of thermostats and the air-exchange can be held at a constant level irrespective of prevailing differences in room temperature.

When a ground-erected building includes an insulated service space 1, all service equipment can be installed quickly and inexpensively and the floor can be heated as a synergistic effect of the design of the ventilation system used. In this regard, an air gap 2 is provided between the floor and an external wall and is terminated in the room by means of a skirting element 3 which is spaced at a convenient distance from the wall, for instance a distance of about 5–7 mm. The skirting 3 is placed around the room at a uniform distance from the wall and will function as a shade moulding or ledge similar to a ceiling shade moulding. The shade moulding need only be connected to the insulated creep space. An electric conductor 4 for the provision of a wall socket 5 may also extend in the gap 2. The main cable is laid so that the wall socket can be located as far away as possible, i.e., at a location where the longest cable is required. When it is desired to move the wall socket to another location, which requires the use of a shorter cable, the excess cable length is simply pushed down into the gap 2, or through the gap, along the external wall. The wall socket 5 is suitably constructed so that outgoing cables or wires can be connected "from beneath", thereby imparting an aesthetic and attractive appearance to the installation and, possibly, also making the installation more child-safe. Neither is it possible to look into the plugs or electric contacts in a conventional manner. Because the foundation has a service space, the entire "fuse-box" assembly can be placed in the space and given a configuration which resembles the electrical fuse boxes used during construction work, i.e., the aesthetic appearance of the fuse boxes become less important. The entrance to the service space may be provided, for instance, in the floor of a wardrobe or closet, or in one side thereof. It shall be possible to operate electric installations with low electric currents. Accordingly, low-current conductors may be drawn from wall sockets to door linings or the like pre-fitted with low-current contacts. Ceiling lighting can, in principle, be avoided, and lighting can be fitted above the windows, so as to illuminate the ceiling indirectly and the room directly. The lighting effect obtained in this way resembles the effect of daylight, in distinction to the lighting effect of a centrally located ceiling lamp.

Electric cables have hitherto been housed in plastic tubes which are often let into the walls of the room concerned. The method of procedure in this regard may be governed by the building material used. With the plastic tubes in place in the building structure, one or more electric cables are then drawn into the tubes. These cables are then connected to boxes for wall sockets, electric switches or electrically-operated devices. These boxes must also be let into the wall concerned, which is a time-consuming and therewith a cost-demanding task, and the working steps of drawing the cable or cables must also be coordinated with other stages of construction work.

In the illustrated insulated service space, there is mounted a fuse box 6 from which electric cables extend. For instance, there is shown a cable which extends from the fuse box to the underside of a wardrobe 7 in the house or dwelling. The floor beneath the wardrobe is provided with a hole into which a hatch is fitted in the bottom of the wardrobe. The hole provided in the floor must be sufficiently large to enable a multi-path electrical contact to be inserted without needing to be dismantled. A cable 8 is laid from the space beneath the wardrobe, e.g., in a groove provided in the skirting or in the gap formed between wall and skirting. The wall socket 5 may conveniently be positioned with a cable length which permits the wall socket to be placed as far away as possible from the wardrobe. The wall socket can then be moved along the entire wall, although the excess cable length 4 must then be pushed down in the gap defined by the service foundation along an external wall of the housing and there allowed to hang freely. When installing, for instance, a washing machine, dishwashing machine or stove, the supplier of these appliances can fit a cable or lead of sufficient length to enable respective appliances to be connected to the fuse box 6. The plug itself is passed through a sufficiently large hole 9 provided in the floor beneath the machine or appliance concerned, and the hole subsequently blocked with a loose stopper that is provided with an appropriate cable throughlet.

Water may be delivered to the house from an external source or from a well that has been drilled beneath the dwelling prior to its construction and subsequently connected to the service space beneath the dwelling. There need be no problem in locating the well in the space beneath the house when using modern submersible pumps. The sewage system may be constructed in a conventional manner, although with a facility for recovering thermal energy from hand basins, baths and showers, this water, subsequent to recovering its thermal energy content being used, for instance, for toilet-flushing purposes. The insulated service foundation provides good access during and after the installation of water and sewage systems. Installation work is greatly simplified by the fact that no high demands are placed on insulation and that the conduits required need not be built into floor and wall structures. All installations are readily accessible for service and for future modifications. A heating coil provided with a cold water pipe or hose 25 can be placed in the service space 1 for heating the cold water.

The majority of modern dwellings are ventilated mechanically. From the aspect of energy savings, it has been found necessary also to recover energy from the air used. In accordance with traditional building techniques, the ventilation ducts and channels have always been installed completely or partially outside the heated volume, for example in the attic space, which is often not insulated. This places high demands on insulation in order to avoid thermal losses. The air is delivered in a direction which is the reverse to natural circulation.

By placing the mechanical ventilation equipment in the insulated service space, it is possible to draw the requisite pipes and channels completely through a heated volume. The service space 1 itself constitutes a channel for supply air to all internal spaces and contains hot air which delivers heat and essentially soundless air flow through the aforesaid gap. All air, or solely air from the wet spaces, can be caused to pass through a heat-exchanger 11 which functions to heat the fresh air 12 taken in from the external surroundings. The fresh air 13 leaving the heat-exchanger may thus be partially heated, but may also require additional heating. This additional heat can be delivered by the air through the radiators 14, which are also placed in the service space in the vicinity of the floor structure, along the outer walls of the foundation. Air circulation from spaces other than the wet spaces can be achieved with the aid of one or more separate fans or blowers. The type of fan used will preferably be characterized by low energy consumption, a long useful life and low sound level. A considerably simpler and therewith cheaper ventilation installation can be achieved by means of the insulated service space. The direction of the various air flows is indicated in the drawings by means of arrows, wherein the arrow 26 identifies exhaust ventilation air.

Any water of condensation that is generated in the ventilation system can be readily returned to the ventilated air in the service space, so as to maintain the correct relative humidity through direct absorption of the condensation by the hot air flow.

It is fully conceivable for the insulated service space to form an independent insulated unit or an insulated unit in which room is found for all of the technical functions of the house concerned, even without mechanical ventilation and heat recovery from the exhaust air. When an air gap is provided around respective outer walls, it is also conceivable to heat the fresh air taken into the insulated service space and therewith heat the floor. The heated air then passes through the gap, through the storey space and out of the house by natural circulation. The provision of an insulated, separate and closed service space, will always result in improved heat economy, either with or without the aforesaid arrangements. The heated floor enables the building to be maintained generally at a lower temperature. Moisture that may penetrate into the insulated service space will never have a deleterious effect, provided that the space is adequately ventilated and provided with drainage possibilities.

All units included in the complete system for heating 15–17 of the radiators 14 and the hot tap water have also been placed in the heated, insulated service space 1, although control panel regulators 18 and thermostats 19 have been placed in corridors or the like in the dwelling area. As before mentioned, the coldest zone of a dwelling is always in the region between floor and outer wall. Accordingly, the house is best heated by placing the radiators 14 immediately beneath the floor structure, along the major length of the outer walls close to the gap 2 defined between outer wall and floor.

The radiators 14 may be a novel type of radiator comprised of a relatively slender tube provided with a large number of radial copper wires which conduct heat from the hot water carried by the pipe. Individual heating along different part-lengths can be obtained with the aid of twin conductors. The radiators can be secured directly to the actual floor structure itself, therewith making installation of the radiators a simple matter. A control cable can be extended from the radiators up to the heated space and coupled to a thermostat 19. The ventilation air, which may already be partially heated, passes from the insulated service space and around the radiators and is thereby further heated before passing through the slots or gaps 2 between floor and outer walls to the living quarters, and therewith deliver heat uniformly to the rooms, the temperatures of which shall be capable of being controlled individually.

A heating system installed in the insulated space may comprise an immersion heater with circulation pump 15, expansion vessel 16, radiators 14 and a water heater 17. The control arrangement and control panel 18 are placed in the living area. Alternatively, heating can be achieved with the aid of a heat pump. Hot and cold water pipes are suspended from or placed on the "shelf" formed by the higher plane in the service foundation in relation to a "corridor" in which a person is able to stand erect or essentially erect beneath the overhead flooring. These hot and cold water pipes are led directly through the floor to respective consumer units. Any surplus heat from the water pipes and drains may be used to heat the air in the service space. Moisture penetrating the service space or water leaking thereinto from the water system can be readily detected and need not therefore damage the insulation in the service space to any appreciable extent. The insulation 20 may consist essentially of loose, supportive slabs or blocks of insulating material, for instance Frigolite, placed directly on the ground. It may be necessary to smooth the surface of the ground or to place shape-adapting insulating mats beneath the slabs or blocks so that the slabs or blocks will lie firmly. The service space, which is insulated downwards, may be provided with a thin layer of cement and a floor drain 24, so that the space can be readily cleaned by rinsing-down the floor and walls of the space with water. When desired, the ground surface can be prepared to enable moisture and/or water to drain therefrom. Since all of the water supply pipes lie in the insulated space, there is no risk of the pipes freezing. All systems, including air purifying filters, telephone lines and central vacuum cleaners located in the insulated service space are readily accessible for service, maintenance, etc., by making the service space large or, for instance, providing the space with a central passageway 28 or corridor which affords standing height on the floor plane. Drainage pipes are laid in the passageway or corridor, together with a floor drain 24 which functions to collect any water entering from a leak in the systems, for instance.

The use of fire for heating living accommodations or dwelling houses has been developed over the past centuries. Tiled stoves were an advanced solution in their time and while producing immediate heat also functioned as a heat storage means. In modern times, the tiled stove has been replaced with the open fire with its much larger and more fascinating fireplace, although the thermal efficiency of an open fire is much lower than that of a tiled stove. Within the last twenty years, different forms of oven inserts and so-called free-standing heaters have been made available, these appliances holding and distributing heat to a better extent even when the fire has been extinguished or died out.

In the case of a built-in oven 21 provided with air-heating ducts 22, hot air can be delivered to the insulated service space for further distribution and for heating any incoming fresh air. The heated air can then be delivered to the living space through the gaps 2 defined between outer walls and floor. Such an oven construction may also be provided with an insert for water-heating and air-heating, of the kind which comprises a multi-jacket encasing 2 for the flue passage or duct, where the internal, mutually concentric tubes contain therebetween water-carrying pipes for heating household water, and the outer, mutually concentric pipes provide therebetween space for an air flow, for instance an incoming flow of fresh air, while heating said air. When the building concerned is provided with a service space, the water and air heating arrangement can be made readily accessible from below, for service and maintenance purposes. The service foundation will also simplify the work of de-sooting and removing ash from the pipes and ducts concerned, by placing beneath the flue duct in the service space a removable flap which provides immediate access to the flue channel.

Although the invention has been described and illustrated with reference to exemplifying embodiments thereof, it will be understood that the invention is not restricted to these embodiments and that modifications can be made within the scope of the following claims.

We claim:

1. A building foundation of a building having at least a bottom story with a floor, which building foundation includes an insulated service space for the accommodation of house-running appliances and service appliances, and a heating means located in said insulated service space, said service space being located between said floor and the ground and being limited by encircling external foundation walls, said floor and said foundation walls defining an open substantially horizontal gap along said foundation walls, through which gap said service space directly communicates with a space above said floor, said gap allowing air flow and cable drawing therethrough, said heating means exhausting heated air directly into said service space to form an insulated heated service space and causing said heated air to flow upwardly through said gap to heat an area above said first floor.

2. A building foundation according to claim 1, including a heat-emitting facility located in the vicinity of said gap beneath said floor, said facility having the form of at least one radiator.

3. A building foundation according to claim 1, including ventilation means (11) arranged in said service space.

4. A building foundation according to claim 1, including devices for connecting the building to an electricity supply source and for distributing said electricity mounted in said service space.

5. A building foundation according to claim 1, including loosely-lying insulating blocks insulating said service space.

6. A building foundation according to claim 1, wherein said service space has a bottom, a part of said bottom being located at a lower level than the rest of said bottom, thereby forming a trench structure.

7. A building structure which includes a foundation having ground floor and side walls, a first floor supported above said ground floor so as to provide a service space therebetween, said first floor being dimensioned to provide an open substantially horizontal gap between an outer edge thereof and said foundation side walls, and a heating means located in said service space for heating air in the entirety of said service space, said heating means exhausting heated air directly into said service space to form a heated service space and causing said heated air to flow upwardly through said gap to heat an area above said first floor.

8. A building structure according to claim 7, further including an electrical supply box located in said service space, and electrical cables which extend from said electrical supply box upwardly through said gap to electrical socket outlets located in an area above said first floor.

* * * * *